Patented July 16, 1946

2,404,038

UNITED STATES PATENT OFFICE 2,404,038

METHOD OF TREATING MUD-LADEN DRILLING FLUIDS

William T. Cardwell, Jr., Whittier, Calif., assignor, by mesne assignments, to California Research Corporation, San Francisco, Calif., a corporation of Delaware No Drawing. Application April 18, 1944, Serial No. 531,643

4 Claims. (Cl. 252—8.5)

This invention relates to a method of improving the characteristics of mud-laden drilling fluids, and particularly relates to a procedure for increasing the viscosity and decreasing the filter loss of certain clays which are normally deficient in these properties.

Heretofore it has been proposed to degel or reduce the viscosity of water-base, mud-laden drilling fluids in which the colloidal materials are native clays by contacting them with complex zeolitic, cation-selective, organic, resinous bodies which are added to the mud fluids in a finely divided condition and remain in them throughout the remainder of the life of said fluids. It is taught, for example, in Patent No. 2,331,281, issued October 12, 1943, that such additions will greatly reduce the viscosity of these drilling fluids.

This invention comprehends broadly a procedure for treating certain clay suspensions in water, for example Otay clay which is mined near the town of Otay in California and which is not normally usable as a colloidal material for drilling purposes, presumably due to its content of exchangeable alkaline earth or other polyvalent cations, to produce a suitable mud fluid having the desired viscosity, wall-building and filter loss characteristics. The preferred procedure outlined consists essentially of preparing a water-insoluble zeolitic, cation-selective or water-insoluble cation-selective organic, resinous material by grinding and classifying it so that it will be retained upon about a 30-mesh screen, contacting this material with a source of alkali metal ions, for example, sodium chloride solution, removing the unreacted alkali metal solution as by a washing operation, adding this coarsely divided and treated material to the clay-water suspension, agitating the suspension until the desired viscosity increase or the desired wall-building property or the desired filter loss has been obtained, separating the coarsely divided material from the treated clay suspension and using the latter in the drilling of oil or gas wells.

The following examples will illustrate the procedure just outlined:

100 parts by weight of a clay suspension comprising water and a commercial drilling fluid clay from section 15-P at Kettleman Hills were gently agitated for 4 hours with 10 parts by weight of a synthetic resin ion exchanger (Amberlite IR-1 manufactured by the Resinous Products and Chemical Company, Inc. of Philadelphia, Pennsylvania), which had previously been left in contact with a concentrated sodium chloride solution. The resin had previously been coarsely ground and classified to be retained upon a 30-mesh screen. After the agitation the coarsely divided resin was screened out of the fluid.

The results of this experiment are shown in Table I.

Table I

|  | Fluid density, lbs. per cu. ft. | Stormer apparent viscosity at 600 R. P. M. centipoises | Filter loss standard API test, cu. cm. in 30 minutes |
|---|---|---|---|
| Untreated suspension | 73.6 | 29 | 31.2 |
| Treated suspension | 73.6 | 100+ (too high to measure conveniently). | 14.2 |

Table I shows that treatment with sodium ions increased the viscosity of the clay suspension. Actually such a high viscosity would not be advantageous for drilling; however, Table I shows that as the viscosity increased, the filter loss decreased. The simultaneity of these two effects indicates that the clay was made more colloidal by treatment with sodium ions.

Table II shows the results of additional experiments on the same clay, in which water was added to the treated suspension to bring it to the same viscosity as that of the untreated suspension.

Table II

|  | Fluid density, lbs. per cu. ft. | Stormer apparent viscosity at 600 R. P. M. centipoises | Filter loss standard API test, cu. cm. in 30 minutes | Yield barrels of drilling fluid per ton of clay |
|---|---|---|---|---|
| Untreated suspension | 73.8 | 31 | 31 | 18.2 |
| Treated suspension | 68.6 | 31 | 19 | 34.2 |

Table II shows that treatment with sodium ions makes it possible to prepare a fluid of a given viscosity that is less dense than one prepared from the untreated clay. Thus it is apparent that nearly twice as much fluid can be prepared from a given amount of this clay after it has been treated according to this invention. The filter loss characteristics of the treated and diluted clay are much better than those of the untreated clay, which is not usually the case when the fluid has been diluted to this extent.

Table III shows the results of experiments similar to those described above on another commercial clay (Otay clay). This clay is widely used in the contact filtration treatment of lubricating oils but heretofore has not been successfully utilized as a colloidal material for drilling fluid.

Table III

|  | Fluid density, lbs. per cu. ft. | Stormer apparent viscosity at 600 R. P. M. centipoises | Filter loss standard API test, cu. cm. in 30 minutes |
| --- | --- | --- | --- |
| Untreated suspension | 67.0 | 5 | 29 |
| Treated suspension | 67.0 | 51 | 12 |

Table III shows that the filter loss has been reduced from that of a poor fluid to that of a good fluid. Although the viscosity has been increased, it is still within the range of that considered practical for drilling fluid and so may be used in place of Aquagel, Wyogel and other highly colloidal bentonitic materials widely used in water-base drilling fluids.

The term "cation-selective body" used in the treatment of these or analogous clays is intended to include the various types of ion selective bodies, both organic and inorganic, that have the ability to adsorb cations from aqueous solution, or to exchange their adsorbed or chemically combined cations for those of the solution in which they are immersed. Examples of such bodies are the synthetic resin ion exchangers that are condensation products of phenolic bodies with aldehydes, and the synthetic resin ion exchangers that are produced by the action of dehydrating agents on substances containing polyhydric phenols, or substances decomposable to give polyhydric phenols. Other examples are the organic and inorganic zeolites, and zeolitic bodies that are familiar in water conditioning processes.

I claim:

1. A method of treating aqueous drilling mud to produce a drilling fluid which will possess desirable viscosity, wall-building and water loss properties when used in the process of drilling a well from a mud which does not originally possess such properties presumably due to the presence of exchangeable alkaline earth or other polyvalent cations, which comprises commingling said mud with a coarsely divided, water-insoluble cation- selective material adapted to substitute alkali metal cations for alkaline earth or other polyvalent cations present in said mud, agitating said mixture to improve its filter loss characteristics to the desired extent, and separating from said improved mud said materials.

2. A method of treating aqueous drilling mud to produce a drilling fluid which will possess desirable viscosity, wall-building and water loss properties when used in the process of drilling a well from a mud which does not originally possess such properties presumably due to the presence of exchangeable alkaline earth or other polyvalent cations, which comprises commingling said mud with a coarsely divided, water-insoluble, cation-selective material adapted to substitute alkali metal cations for alkaline earth or other polyvalent cations present in said mud, agitating said mixture to increase its viscosity to the desired extent and separating from said thickened fluid said material.

3. A method according to claim 2, with the added step of pretreating said zeolitic material by contacting it with a concentrated alkali metal salt solution.

4. The process of preparing an aqueous mud-laden fluid for well drilling from a clay which is normally not suitable for such use presumably due to the presence of exchangeable polyvalent cations, comprising the step of forming a suspension of said clay in water, mixing with said suspension a coarsely divided, water-insoluble, cation-selective material containing alkali metal ions which can be substituted for those originally present in said clay, agitating said mixture to improve the properties of said suspension for well drilling and separating said suspension from said material.

WILLIAM T. CARDWELL, Jr.